Feb. 28, 1950      N. C. BREMER      2,498,788

TIMING CHAIN

Filed June 27, 1945

Inventor:
Norman C. Bremer

Patented Feb. 28, 1950

2,498,788

UNITED STATES PATENT OFFICE 2,498,788

TIMING CHAIN

Norman C. Bremer, Ithaca, N. Y., assignor to Morse Chain Company, Ithaca, N. Y., a corporation of New York Application June 27, 1945, Serial No. 601,777

11 Claims. (Cl. 74—250)

This invention relates generally to driving gear chains, and has more particular reference to chains for actuating the cam shaft of internal combustion engines such as are employed in motor driven vehicles.

Heretofore it has been the practice, when assembling a roller chain of this character, to press fit the side bearings or outer link plates onto the ends of the bushings that surround the pintles, thus permitting the center portion of the bushing to carry the member which engages the sprocket. An objection to this manner of assembly is that rather heavy press fits are usually required to dependably maintain the side bearings or outer link plates in position during service. The heavy pressure required for making these fits creates constrictions at the ends of the bushings which results in the formation of a barrel-like bore therein and consequently the only effective bearing between a pin and bushing is at the extreme ends of the bushing. Hence, there is rapid wear at the bushing ends due to the relatively small surface contact, and this causes an unnecessary elongation of the chain during the initial use thereof. Timing chains require fixed centers and this initial elongation is extremely objectionable since the chain becomes relatively loose, there is uneven timing, and flutter or whip is created in the chain during its operation.

It is, therefore, one of the principal objects of the present invention to simplify the construction of timing chains such as contemplated herein, and to improve the efficiency, operation and dependability of such chains.

Also, it is one of the principal objects of this invention to overcome the above-mentioned inherent objections in chains and to provide an assembly wherein load carrying plates or inner links occupy a position near the centers of the bushings and the outer chain links are press fitted to the ends of the pintles beyond the bushings. This successfully avoids the formation of a barrel-shaped bearing surface in the bushing.

Another object hereof is to provide a timing chain assembly wherein there are uniform bearing surfaces between the pintles and the bushings tending to permit only uniform wear upon bearing surfaces of relatively large areas. Thus, initial elongation of the chain is reduced to a minimum.

Still another object is to provide a timing chain wherein the roller or inner link plates are constructed and arranged so that they will permit the use of stronger members. The arrangement also effects a material reduction in the number of parts of a chain of a given endurance strength thus proportionately reducing the overall weight of the chain.

The present improvements also contemplate the provision of wing-like extensions on the intermediate or roller link plates, said extensions being arranged to project over the bushings which are adjacent a pair of bushings on which the link plates are supported, so that during straight runs of the chain they are adapted to engage said adjacent bushings thereby to prevent back-bend of the chain.

Other objects, aims and advantages of the invention contemplated herein will be apparent to persons skilled in the art after the construction and operation of the improved chain is understood from the within description. It is preferred to accomplish these objects and to practice the invention in substantially the manner hereinafter fully described and as more particularly pointed out in the appended claims. Reference is now made to the accompanying drawings that form a part hereof, in which:

The drawings are to be understood as being more or less of a schematic character and are for the purpose of disclosing a typical or preferred embodiment of the invention contemplated herein.

Figure 1:
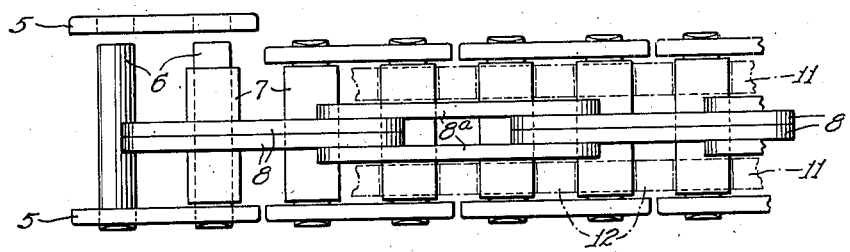
Fig. 1 is a top plan view showing a preferred assembly of the improved timing chain.
Figure 2:
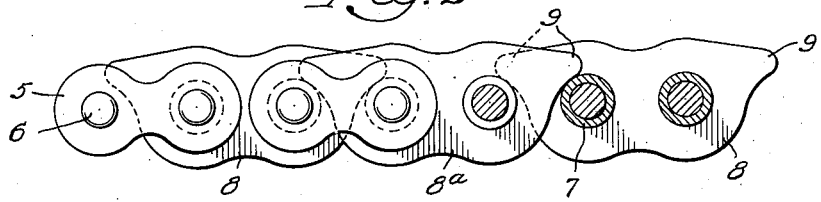
Fig. 2 is a side view of the chain with a portion broken away to disclose the arrangement for preventing back-bend.

The chain shown herein, as best seen in Figs. 1 and 2, preferably comprises the outside or pin link plates 5 arranged opposite each other in pairs, each having a somewhat dumb-bell or hourglass shape in contour. The pintles or pins 6 carry cylindrical bushings 7 which are of shorter length than the pins so that said pins project beyond the ends of the bushings to receive the outer link plates 5.

In assembling the pintles 6 with these outer link plates 5, said pintles are inserted through openings in the plates and the projecting ends of the pins are upset slightly to maintain the bushings with slight clearances between their ends and the adjacent faces of the plates. It will be seen that the outer or pin link plates 5 are arranged in longitudinal rows with pairs of plates joined by pairs of pintles 6 to provide separate sets spaced from each other.

The inner links are preferably arranged in pairs, as seen in Fig. 1, and comprise lobe shaped link plates 8 and 8a that are positioned in successive order between the ends of the bushings and spaced from the inner faces of the pin link plates 5. These inner link plates 8 and 8a are of identical shape throughout the length of the chain and they have openings through which the bushings 7 pass and to which they are secured in any suitable manner, preferably by a sweating process or by some heat treatment method which fixedly secures said link plates to the bushings. These inner link plates are arranged in pairs with the plates 8 preferably in surface contact with each other and with the plates 8a spaced apart and overlapping or outside the adjacent pairs of plates 8. This arrangement of these inner link plates constitutes what may be termed an intermediate strand of the chain. All of the inner link plates 8 have wing-like extensions 9 at their ends that result in overlapped arrangement of these links. It will be understood that a pair of inside link plates are secured to a pair of adjacent bushings that carry the proximate portions of successive pin link plates 5 so that these inside link plates join the pairs of outer links to provide a continuous chain. It will be seen that the wing-like extensions 9 of one set of plates 8 extend over and normally engage the bushings 7 of the other pair of plates, thus preventing back-bend of the chain in the straight runs between the sprockets.

Figure 3:
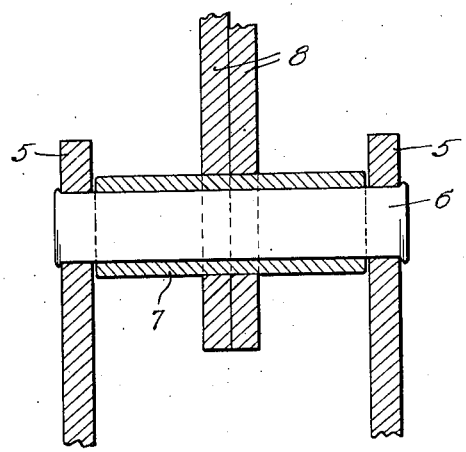
Fig. 3 is an enlarged axial section, through a pintle and bushing, showing the improved bearing arrangement.

The pintles 6 have a true cylindrical surface, as seen in Fig. 3, and the bushings 7 have true cylindrical bores. Thus, the bearing surfaces between the pintles and bushings have maximum superficial areas and the tendency to initial wear is reduced to a minimum because a whole bearing surface wears evenly. The arrangement also prevents the formation of a barrel-shaped bearing surface in the bushing whereby only the outer end regions of the bushing are initially engaged with its pintle.

Figure 4:
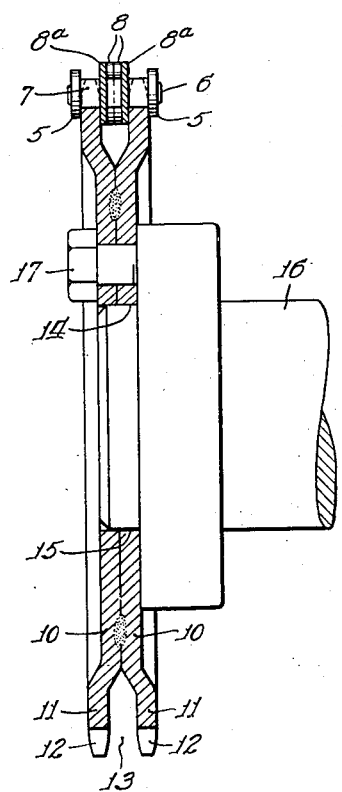
Fig. 4 is a sectional view of an assembly of a sprocket construction, showing the improved timing chain thereon.

The inner links or bushing carried plates 8 and 8a are spaced a sufficient distance from the outer links or pin plates 5 to accommodate and coact with a double toothed sprocket. An assembly of a sprocket that is well adapted for use with the chain contemplated herein is shown in detail in Fig. 4. This sprocket comprises two identical metal members 10, that are stamped out of sheet metal discs with their peripheral margins offset in the manner shown at 11, and have suitably shaped teeth 12. These metal sprocket members are reversed and placed back-to-back and spot welded together in a manner so that the offset margins and teeth are separated by a space 13 that is sufficient to accommodate therein the strand of inner link plates 8 and 8a. The outer or pin link plates 5, as seen in Fig. 4, are those positioned along the outside surfaces of the sprocket. A central opening 14 is made in the sprocket to seat a shoulder 15 of the cam shaft flange 16 to which the sprocket is secured by bolts 17.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A timing chain and the like comprising a plurality of side links; pintles joining said side links; bushings rotatable on said pintles between said side links; a plurality of inner links secured to the mid-regions of said bushings in spaced relation to said side links; and wing-like extensions at the ends of said inner links arranged so that the extensions of one set of inner links engages the bushings of another set of inner links when the chain tends to bend back.

2. A timing chain and the like comprising a plurality of pairs of side links arranged in spaced longitudinal order; a plurality of inner links arranged in pairs in overlapping order with respect to said side links; pivotal means connecting said side links and inner links at the overlapped regions thereof, said pivotal means being adapted to permit articulation of the chain at the overlapped regions of the links during engagement of the chain with an arcuate member; and wing-like extensions at the ends of said inner links, said extensions being adapted to engage said pivotal means and thereby prevent articulation of the chain when the chain tends to bend back.

3. A timing chain and the like comprising side links arranged in pairs, pintles connecting each pair of side links; bushings rotatable on said pintles between said side links; a central strand of inner links arranged in sets, the links of each set secured to adjacent bushings of successive pairs of side links and rotatable with said bushings; wing-like extensions on said inner links arranged so that the extensions of one set of inner links engage the bushings of another set of inner links when the chain tends to bend back.

4. A timing chain comprising side links arranged in pairs; pintles connecting each pair of side links; bushings rotatable on said pintles between said side links, said bushings having internal bearing surfaces of uniform diameter throughout their lengths; a central strand of inner links arranged in sets, the links of each set secured to adjacent bushings of successive pairs of side links and rotatable with said bushings; wing-like extensions on said inner links arranged so that the extensions of one set of inner links engages the bushings of another set of inner links when the chain tends to bend back.

5. A timing chain comprising pivot carrying outer links arranged in a longitudinal row at each side of the chain with the links in one row alined with the links in the other row to provide spaced separate pairs; a pair of pintles press fitted to each pair of outer links; bushing-carrying inner links providing a longitudinal strand intermediate said rows, said inner links being arranged in alternate relation to said pairs of outer links; and bushings rotatable on said pintles, said bushings being continuous between opposite side links with their mid-regions passed through and anchored to the links of said intermediate strand; said bushings having internal bearing surfaces that are of uniform diameters throughout their lengths to provide maximum initial bearing surfaces with respect to said pintles.

6. In a chain, the combination comprising side links arranged in pairs and pintles connecting each pair of side links, bushings rotatable on said pintles between said side links, a central strand of inner links arranged in sets, the links of each set secured to adjacent bushings of successive pairs of side links and rotatable with said bushings, and wing-like extensions on said inner links arranged so that the extensions of one set of inner links engage the bushings of another set of inner links when the chain tends to bend back.

7. In a chain, the combination comprising a plurality of side links, pintles joining said side links, bushings rotatable on said pintles between said side links, a plurality of inner links secured to the mid-regions of said bushings in spaced relation to said side links, and means defining extensions at the ends of said inner links arranged so that the extensions of one set of inner links engages the bushings of another set of inner links when the chain tends to bend back.

8. In a timing chain and the like comprising a plurality of pairs of side links arranged in spaced longitudinal order, and a plurality of inner links arranged in pairs in overlapping order with respect to said side links, the combination of pivotal means connecting said side links and inner links at the overlapped regions thereof, said pivotal means being adapted to permit articulation of the chain at the overlapped regions of the links during engagement of the chain with an arcuate member, and wing-like extensions at the ends of said inner links, said extensions being adapted to engage said pivotal means and thereby prevent articulation of the chain when the chain tends to bend back.

9. In a timing chain and the like comprising a plurality of side links, pintles joining said side links, bushings rotatable on said pintles between said side links, and a plurality of inner links secured to the mid-regions of said bushings in spaced relation to said side links, those improvements comprising the disposition of wing-like extensions at the ends of said inner links arranged so that the extensions of one set of inner links engages the bushings of another set of inner links when the chain tends to bend back.

10. In a chain comprising a plurality of pairs of side links arranged in spaced longitudinal order, a plurality of inner links arranged in pairs in overlapping order with respect to said side links and pivotal means connecting said side links and inner links at the overlapped regions thereof, said pivotal means being adapted to permit articulation of the chain at the overlapped regions of the links during engagement of the chain with an arcuate member, and said inner links having means defining extensions disposed at the ends thereof, said extensions being adapted to engage said pivotal means and thereby prevent articulation of the chain when the chain tends to bend back.

11. In a chain comprising a plurality of pairs of side links arranged in spaced longitudinal order, the combination of a plurality of inner links arranged in pairs in overlapping order with respect to said side links, pivotal means connecting said side links and inner links at the overlapped regions thereof, said pivotal means being adapted to permit articulation of the chain at the overlapped regions of the links during engagement of the chain with an arcuate member, and means defining extensions at the ends of said inner links, said extensions being adapted to engage said pivotal means and thereby prevent articulation of the chain when the chain tends to bend back.

NORMAN C. BREMER.

REFERENCES CITED

The following references are of record in the file of this patent:

UNITED STATES PATENTS

| Number | Name | Date |
| --- | --- | --- |
| 615,203 | Woodcock | Nov. 29, 1898 |
| 1,734,688 | Morse | Nov. 5, 1929 |
| 1,743,157 | Morse | Jan. 14, 1930 |
| 1,877,339 | Kottlowski | Sept. 13, 1932 |
| 2,219,125 | Bremer | Oct. 22, 1940 |